Feb. 28, 1939.  C. BERRY  2,148,924
SPRING WHEEL
Filed June 15, 1937  2 Sheets-Sheet 1

Inventor
Charles Berry
By Clarence A O'Brien
Hyman Berman
Attorneys

Patented Feb. 28, 1939

2,148,924

UNITED STATES PATENT OFFICE 2,148,924

SPRING WHEEL

Charles Berry, Abilene, Tex.

Application June 15, 1937, Serial No. 148,375

2 Claims. (Cl. 152—52)

My invention pertains to resilient vehicle wheels in general, but has reference in particular to what may be conveniently called a spring spoke wheel construction.

There is an apparent need, it is believed, for a vehicle wheel wherein a solid rim may be yieldably and adjustably joined to a complemental hub in order to provide a self accommodating spring balanced and supported rim susceptible of fulfilling the requirements for which it is adapted and to thereby do away with pneumatic tires. This fact is borne out by similar prior art structures embodying the same fundamental principles of construction and operation.

In reducing to practice the principles of the specific conception with which we are herein concerned, I have therefore evolved and produced an arrangement adequately fitted for the purposes intended and possessed of noteworthy features of refinement and distinction regarded as differentiating it from similar prior art wheel structures.

As will be hereinafter seen, the chosen embodiment of the invention is susceptible of satisfactorily complying with the requirements of the trade and is therefore characterized by self evident features and advantages.

In the drawings, wherein I use corresponding reference numerals to designate corresponding mechanical elements and parts:

Figure 1:
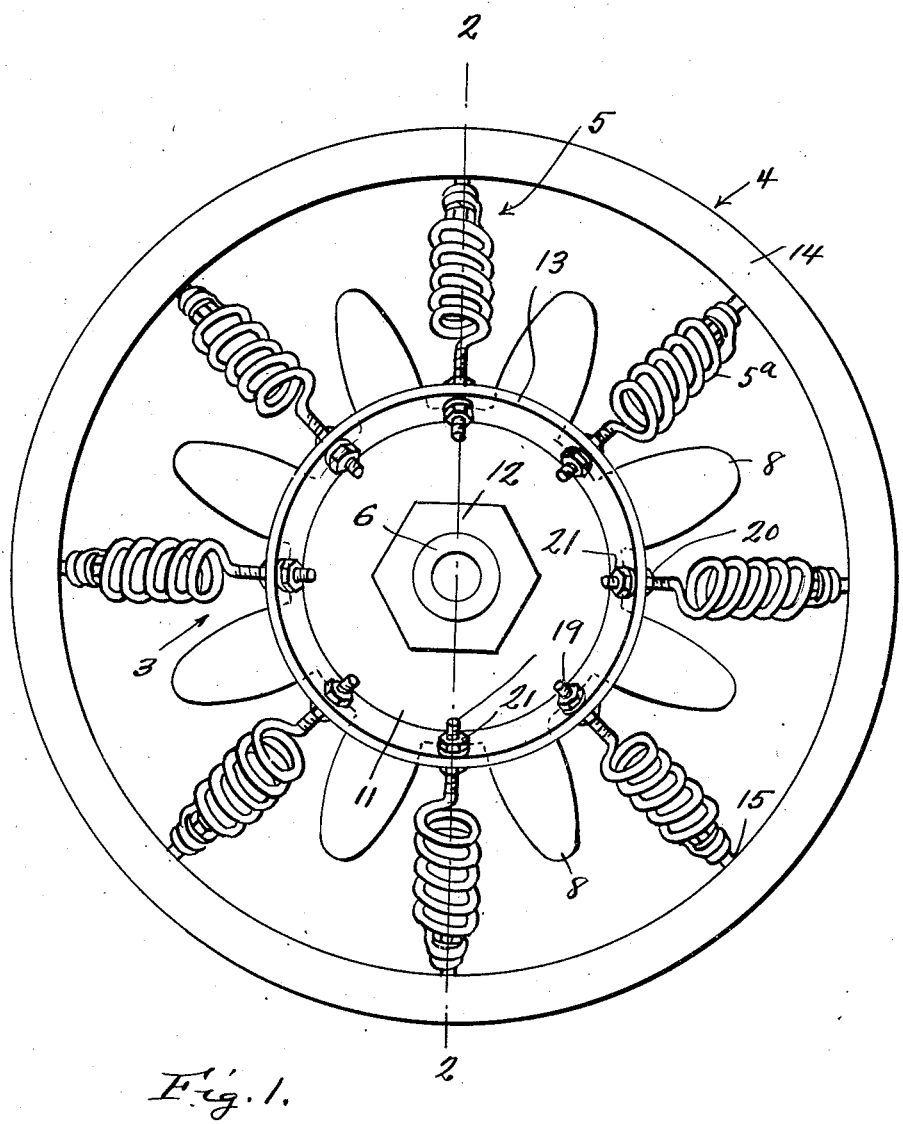
Figure 1 is a side elevational view of a spring wheel constructed in accordance with my ideas.
Figure 2:
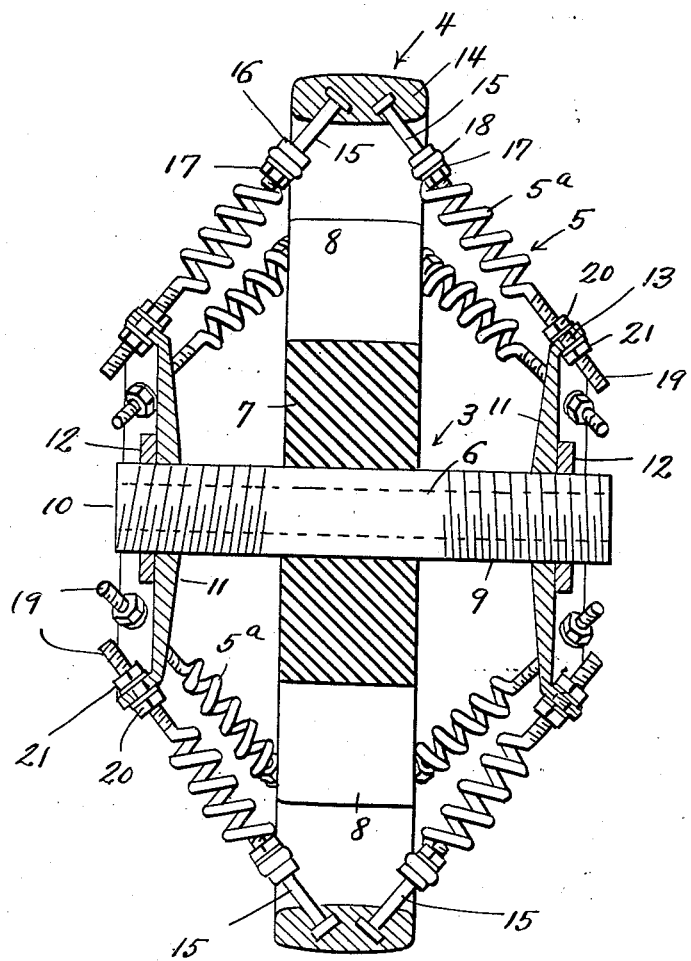
Figure 2 is a central vertical section taken on the plane of the line 2—2 of Figure 1.

Referring now to the drawings by distinguishing reference numerals, it will be observed that the hub structure, as a unit, is denoted by the numeral 3, the rim construction is indicated, as a unit, by the numeral 4, and the multiple spring spoke assembly is unitarily indicated by the numeral 5.

The hub unit 3 comprises a horizontally disposed tubular metal bearing or sleeve 6 anchored midway of its ends in a disk-like body of rubber 7. The rubber body is provided with marginal radially disposed circumferentially spaced lugs 8 which constitute abutments or cushioning elements to limit the inward and outward radial movement of the relatively movable rim means 4. The portions of the tubular sleeve or bearing 6 projecting beyond the hub body 7 are formed with right hand and left hand screw-threads 9 and 10, respectively. These threads serve to accommodate duplicate bodily adjustable thrust or head plates 11. The plates 11 are disposed in opposed parallelism to the hub body 7 and are held in adjusted position through the instrumentality of lock nuts 12. It is to be observed that the thrust plates 11 are of a diameter terminating within the circle defined by the outer ends of the abutment lugs 8. Then, too, the peripheral or marginal portions of said thrust plates are disposed laterally, that is, directed laterally outwardly as at 13 to form endless attaching flanges for the coiled spring spokes 5a.

The rim unit or means 4 comprises an annulus 14 surrounding the lugs 8 in concentric radial relationship. On its inner periphery it is provided with suitably anchored outwardly diverging studs or bolts 15 equipped with shoulders 16 and retaining nuts 17.

All of the spokes 5a are of duplicate construction. Each spoke is in the form of a coiled spring of suitable proportions and tensile strength. The outer ends are formed into eyes 18 adjustably and removably clamped between the shoulders 16 and retaining nuts 17. The inner end of each spoke is formed into a screw-threaded shank 19 extending through an aperture in the accommodation flange 13. Nuts 20 and 21 serve to cooperate with the shank 19 and flange 13 to adjustably connect said shank with the flange. This provides one source of adjustment for regulating the tension of the spokes severally or collectively.

The main adjustment is acquired through the instrumentality of the bodily adjustable thrust plates 11 on the screw-threaded end portions 9 and 10 of the mounting 6, that is, the bearing. The relative adjusted positions of the plates 11 are maintained by the lock nuts 12 and the major adjustment can be further refined by way of the shanks 19 and nuts 21 and 20 coacting with the companion flange 13. Thus, the parts have been carefully selected so that the coiled spring spokes 5a are disposed in groups or sets projecting divergingly from opposite sides of the rim 14. This therefore provides a sensitive yet reliable spring suspension for the rim 14. That is to say, the rim 14 becomes a floating member suspended on the hub through the instrumentality of the plates 11 and bearing 6. Added to this is the shock absorbing feature comprising a hub body 7 with the abutments 8 whereby to limit the movement of the rim toward and from the hub.

As before stated, the invention relates to an art wherein the broad proposition of elastic and spring spokes is broadly old. Therefore, the novelty resides in the specific hub construction, the rim arrangement, and the particular springs which serve to coordinate the parts into requisite operative relationship.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

1. A spring wheel of the class described comprising a tubular member, a hub member composed of rubber and through the center of which the tubular member passes, the ends of the tubular member projecting from the hub member, a plurality of radiating and spaced rubber projections extending outwardly from the hub member and formed integrally with said hub member and said hub member and the projections being of the same width, each projection having outwardly tapering edge portions and a rounded outer end, a rim surrounding the projections and spaced therefrom radially, a plurality of pairs of outwardly diverging circumferentially spaced coiled springs connected at their outer ends with the rim and means for connecting the inner ends of the springs with the projecting ends of the tubular member.

2. A spring wheel of the class described comprising an elongated tubular member having its ends oppositely threaded, a circular plate threaded on each of said ends, means for holding each plate in adjusted position, each plate having an outwardly inclined flange provided with perforations, a plurality of pairs of coiled springs, each having a straight and threaded inner end passing through a perforation, inner and outer nuts threaded on said end of the spring and bearing against the inner and outer faces of the flange, a rim, a plurality of pairs of bolts extending inwardly from the rim and the bolts of each pair being divergently arranged, the outer ends of the springs having eyes engaging the bolts, means for holding said eyes on said bolts and a member of resilient material surrounding the central portion of the tubular member and located in the space formed by the rim and having integral outwardly extending radial projections on its outer circumference, said projections also being formed of resilient material and of the same width of the member with their side edges tapering outwardly, the outer ends of the projections being normally spaced from the rim.

CHARLES BERRY.